US007477991B2

(12) United States Patent
Cross et al.

(10) Patent No.: US 7,477,991 B2
(45) Date of Patent: Jan. 13, 2009

(54) GPS DEVICE AND METHOD FOR REDUCING LIGHT EMITTED BY DISPLAY

(75) Inventors: John Cross, Overland Park, KS (US); Christopher Lalik, Overland Park, KS (US); John DeCastro, Lenexa, KS (US); Richard Ball, Overland Park, KS (US)

(73) Assignee: Bushnell Performance Optics, Overland Park, KS (US)

( * ) Notice: Subject to any disclaimer, the term of this patent is extended or adjusted under 35 U.S.C. 154(b) by 365 days.

(21) Appl. No.: 11/079,035

(22) Filed: Mar. 12, 2005

(65) Prior Publication Data

US 2006/0206263 A1 Sep. 14, 2006

(51) Int. Cl.
*G01C 21/00* (2006.01)

(52) U.S. Cl. ....................... 701/213; 701/211; 701/207; 701/200; 345/156

(58) Field of Classification Search ................. 701/200, 701/213, 211, 207; 345/30, 435, 156; 348/563; 342/357.06
See application file for complete search history.

(56) References Cited

U.S. PATENT DOCUMENTS

| | | | | |
|---|---|---|---|---|
| 5,424,524 | A * | 6/1995 | Ruppert et al. | 705/8 |
| 5,640,002 | A * | 6/1997 | Ruppert et al. | 235/462.46 |
| 6,477,464 | B2 * | 11/2002 | McCarthy et al. | 701/213 |
| 6,678,614 | B2 * | 1/2004 | McCarthy et al. | 701/213 |
| 7,158,851 | B2 * | 1/2007 | Funk | 700/121 |
| 2001/0039475 | A1 * | 11/2001 | McCarthy et al. | 701/213 |
| 2002/0033789 | A1 * | 3/2002 | Miyata et al. | 345/89 |
| 2003/0065444 | A1 * | 4/2003 | McCarthy et al. | 701/213 |
| 2004/0037597 | A1 * | 2/2004 | Haseba et al. | 399/328 |
| 2004/0148102 | A1 * | 7/2004 | McCarthy et al. | 701/213 |
| 2004/0207573 | A1 * | 10/2004 | Ide | 345/60 |
| 2005/0151846 | A1 * | 7/2005 | Thornhill | 348/149 |
| 2005/0165683 | A1 * | 7/2005 | Taylor | 705/44 |
| 2006/0128475 | A1 * | 6/2006 | Vitito | 463/46 |
| 2006/0206263 | A1 * | 9/2006 | Cross et al. | 701/211 |
| 2006/0268105 | A1 * | 11/2006 | Jacobs et al. | 348/53 |
| 2007/0013652 | A1 * | 1/2007 | Kim et al. | 345/156 |
| 2007/0186804 | A1 * | 8/2007 | Heckmann et al. | 106/31.6 |

FOREIGN PATENT DOCUMENTS

JP 59111149 A * 6/1984

(Continued)

OTHER PUBLICATIONS

Manufacturing hurdles challenge large-LCD developers; Stix, G.; Spectrum, IEEE; vol. 26, Issue 9, Sep. 1989 pp. 36-40; Digital Object Identifier 10.1109/6.90182.*

(Continued)

*Primary Examiner*—Cuong H Nguyen
(74) *Attorney, Agent, or Firm*—Spencer Fane Britt & Browne

(57) ABSTRACT

A GPS device and method for converting display information between a first display mode and a second display mode by negativizing pixels or other image elements, wherein negativizing entails converting relatively larger areas of lighter image elements to darker image elements and converting relatively smaller areas of darker image elements to lighter image elements so as to result in reduced total emission of light.

8 Claims, 3 Drawing Sheets

FOREIGN PATENT DOCUMENTS

| | | | | |
|---|---|---|---|---|
| JP | 62034017 | A | * | 2/1987 |
| JP | 2000088746 | A | * | 3/2000 |
| JP | 2001096795 | | * | 3/2001 |

OTHER PUBLICATIONS

Fundamentals of machine vision lighting; Novini, A.; WESCON/'93. Conference Record, Sep. 28-30, 1993 pp. 44-52 Digital Object Identifier 10.1109/WESCON.1993.488407.*

Waiting with Jose, a vision-based mobile robot; Elinas, P.; Hoey, J.; Lahey, D.; Montgomery, J.D.; Murray, D.; Se, S.; Little, J.J; Robotics and Automation, 2002. Proceedings. ICRA '02. IEEE International Conference on; vol. 4, May 11-15, 2002 pp. 3698-3705 vol. 4; Digital Object Identifier 10.1109/ROBOT.2002.1014284.*

Visualization of evolutionary computation processes: from the perspective of population; Hsu-Chih Wu; Chuen-Tsai Sun; Sih-Shin Lee; Intelligent Control and Automation, 2004. WCICA 2004. Fifth World Congress on; vol. 3, Jun. 15-19, 2004 pp. 2077-2081 vol. 3; Digital Object Identifier 10.1109/WCICA.2004.1341950.*

A video retrieval system based on compressed data from MPEG files; Nguyen, D.T.; Gillespie, W.; TENCON 2003. Conference on Convergent Technologies for Asia-Pacific Region; vol. 2, Oct. 15-17, 2003 pp. 555-560 vol. 2; Digital Object Identifier 10.1109/TENCON.2003.1273222.*

Application of stereovision in a navigation aid for blind peopleWong, F.; Nagarajan, R.; Yaacob, S.; Information, Communications and Signal Processing, 2003 and the Fourth Pacific Rim Conference on Multimedia. Proceedings of the 2003 Joint Conference of the Fourth International Conference on;vol. 2, Dec. 15-18, 2003 pp. 734-737 vol. 2.*

Human-friendly interaction for learning and cooperation; Kristensen, S.; Horstmann, S.; Klandt, J.; Lohnert, F.; Stopp, A.; Robotics and Automation, 2001. Proceedings 2001 ICRA. IEEE International Conference on; vol. 3, 2001 pp. 2590-2595 vol. 3; Digital Object Identifier 10.1109/ROBOT.2001.933013.*

* cited by examiner

GPS DEVICE AND METHOD FOR REDUCING LIGHT EMITTED BY DISPLAY

BACKGROUND OF THE INVENTION

1. Field of the Invention

The present invention relates broadly to hand-held electronic GPS-based navigation aids and related methods for facilitating navigation. More particularly, the present invention concerns a GPS device and method for converting display information between a first display mode and a second display mode by negativizing pixels or other image elements, wherein negativizing entails converting lighter image elements to darker image elements and converting darker image elements to lighter image elements so as to result in reduced total emission of light.

2. Description of the Prior Art

Outdoor enthusiasts, sportsmen, law enforcement personnel, military personnel, and many others increasingly use hand-held electronic global positioning system (GPS) devices to navigate while afield. Commonly-available GPS devices typically include at least a processor, a receiver, and an antenna for receiving position signals from a plurality of known locations (from, e.g., satellites in orbit) and, through a process of geometric triangulation, determining the relative location of the GPS device in terms of latitude, longitude, and even altitude. Many such devices allow users to display a variety of different types of maps, other images, navigation tools, and other information on a display component which is often a liquid crystal display (LCD) screen. The display component uses pixels or other image elements to communicate the information. When activated, these image elements allow light to pass through the screen, produce light, or otherwise result in an emission of light from the screen. The amount of emitted light can be substantial, and, in relatively dark ambient conditions, can be visible from a significant distance by people or animals. In the case of a hunter, for example, the emitted light could alert or drive away any wild game. Similarly, in the case of military personnel, the emitted light could alert an enemy of the user's location.

It is known in the prior art to allow users to manually control, at least to some extent, the color of one or more display elements. As such, it is possible for users to manually specify relatively dark display colors. Unfortunately, manually specifying different colors requires a significant amount of time and effort to navigate menus and make selections, which cannot be done quickly or easily at any time, particularly not in the field under low light or other difficult conditions.

Due to these and other disadvantages in the prior art, a need exists for a GPS device capable of displaying information while minimizing emitted light.

SUMMARY OF THE INVENTION

The present invention overcomes the above-described and other disadvantages in the prior art by providing a GPS device and method for converting display information between a first display mode and a second display mode by "negativizing" pixels or other image elements, wherein negativizing entails converting lighter image elements to darker image elements and converting darker image elements to lighter image elements so as to result in reduced total emission of light.

The first display mode functions substantially similar to the single display modes of prior art GPS devices. When the user desires to minimize emitted light, however, the user can select the second display mode which results in the display information being negativized. If, for example, the GPS device's output display operates in gray scale, then for each shade of gray in the first mode, there is a corresponding shade of gray in the second mode such that overall shading is darker in the second mode than in the first, which results in less emitted light. Similarly, if the output display operates in color, then for each color or shade of color in the first mode, there is a corresponding color or shade of color in the second mode. Because there are almost always relatively larger areas of lighter shading in the first mode, there will almost always be relatively larger areas of darker shading in the second mode so that, as a result of the conversion, less light is emitted in the second mode.

Thus, it will be appreciated that the GPS device and method of the present invention provides a number of substantial advantages over the prior art, including, for example, allowing for displaying information in a conventional first display mode, and for displaying substantially the same information in a second display mode which emits less light than the first mode.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF THE PREFERRED EMBODIMENT(S)

With reference to the figures, a GPS device 10 and method are herein described, shown, and otherwise disclosed in accordance with the preferred embodiment(s) of the present invention. More specifically, referring to FIG. 1, the present invention concerns a GPS device 10 and method for converting display information between a first display mode and a second display mode by negativizing pixels or other image elements, wherein negativizing entails converting lighter image elements to darker image elements and converting darker image elements to lighter image elements so as to result in reduced total emission of light.

Figure 1:
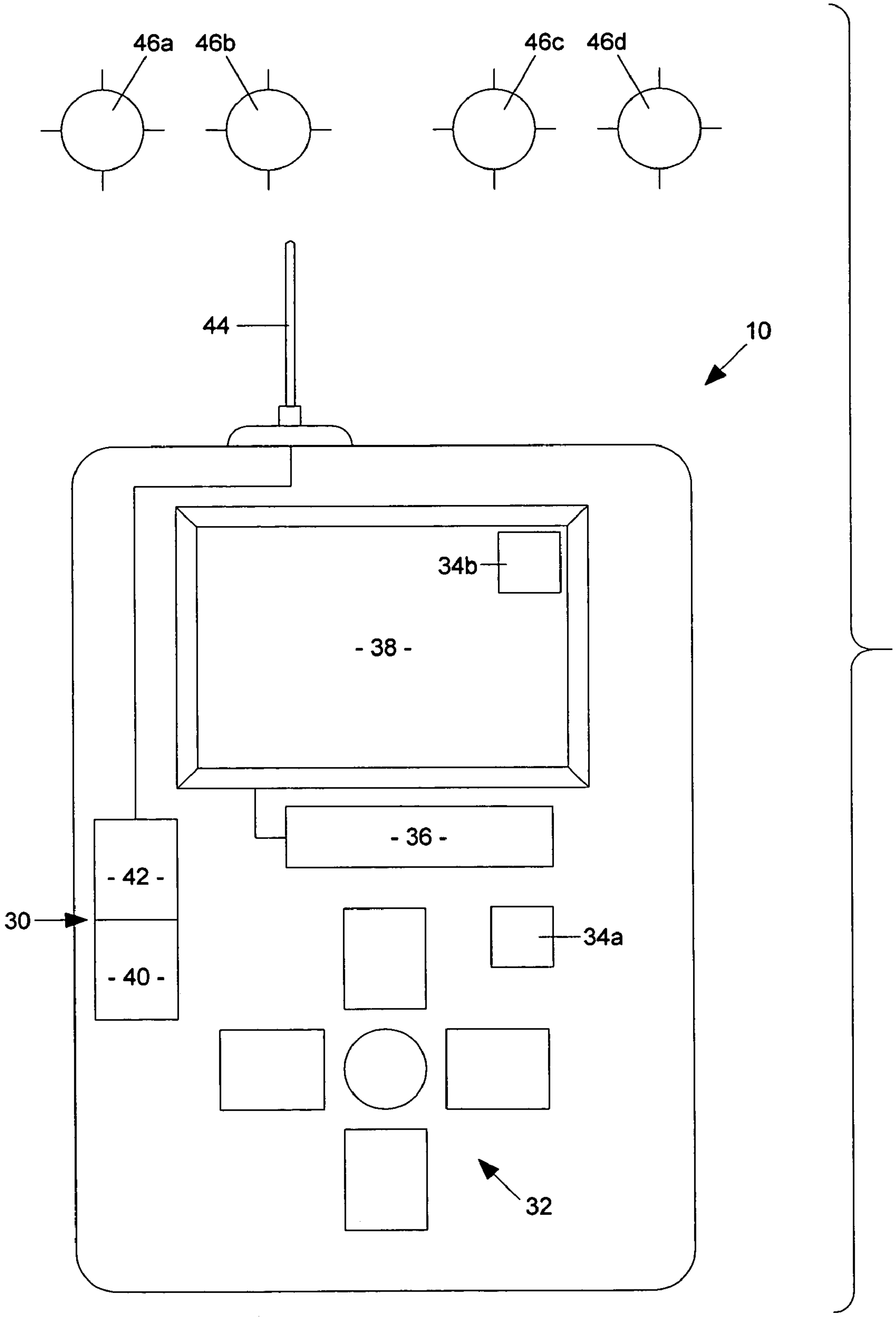
FIG. 1 is a block-diagram depiction of a preferred embodiment of a GPS device of the present invention.

Referring to FIG. 1, a preferred embodiment of the GPS device 10 broadly comprises a GPS unit 30; an input interface 32, including a display mode selection device 34*a*,34*b*; a processor 36; and an output display 38. It will be appreciated that GPS technology for determining location is well-known to those with ordinary skill in the art, and therefore the present disclosure focuses primarily on the claimed features that comprise the present invention rather than on said basic technology. The GPS device 10 as a whole is preferably appropriately designed and constructed so as to be lightweight, rugged, waterproof, and otherwise resistant to relatively harsh operating environments and conditions.

The GPS unit 30 broadly includes at least a processor 40, a receiver 42, and an antenna 44 for, in a conventional manner, receiving signals from a plurality of known locations 46*a*, 46*b*,46*c*,46*d* (e.g., satellites) and, through a process of geometric triangulation, determining the relative location of the GPS unit 30.

The input interface 32 allows the user to enter information when prompted or otherwise as appropriate, including selecting a desired display mode. As such, the input interface 32 may take any suitable form and use any suitable input technology such as, for example, keypad, touch-screen, or scroll-wheel technologies. Selection of the first or second display modes is preferably controlled by a dedicated selection device, which may be a physical button or switch 34*a*; a virtual button, switch, or icon 34*b*; or both.

The processor 36 appropriately conditions information for display, including converting information for display in accordance with the selected display mode, as described below.

The output display 38 allows the GPS device 10 to communicate with the user, including displaying information and, when appropriate, presenting selections and/or prompting the user to make selections or otherwise enter input. As such, the output display 38 may take any suitable form and use any suitable technology such as, for example, LCD technology. The output display 38 uses a multitude of pixels or other image elements to communicate the display information. The shade or color of each individual pixel is determined by the pixel's description contained in a series of data bits in a particular order and of a particular length. Generally, pixels with lighter shades or colors emit more light than pixels with darker shades or colors. Prior art GPS devices have only one display mode which generally makes greater use of lighter shades or colors. The present invention, however, allows a user to select between first and second display modes in order to control the amount of emitted light.

The first display mode functions substantially similar to the single display modes of prior art GPS devices. When the user desires to minimize emitted light, however, the user can select the second display mode using the mode selection device 34*a*,34*b*. Such selection causes the processor 36 to negativize the display information. If the output display 38 operates in gray scale then for each shade of gray in the first mode, there is a corresponding shade of gray in the second mode such that overall shading is darker in the second mode than in the first, which results in less emitted light. For example, when converting from the first mode to the second mode, all or a portion of the pixels or other image elements appearing to be white may be converted so as to appear black, and all or a portion of the pixels or other image elements appearing to be black may be converted so as to appear white. Likewise, lighter shades of gray may be converted so to appear as corresponding darker shades of gray, while darker shades of gray may be converted so as to appear as corresponding lighter shades of gray. Such conversions are made by the processor 36 in accordance with a pre-established conversion scheme. In the case of pixels, the conversion might be accomplished by changing at least a portion of the pixels' data bit descriptions.

If the output display 38 operates in color, then for each color or shade of color in the first mode, there is a corresponding color or shade of color in the second mode, such that overall color or color shading is darker in the second mode than in the first, which results in less emitted light. For example, when converting from the first mode to the second mode, all or a portion of the pixels or other image elements appearing to be a particular lighter color may be converted so as to appear a corresponding darker color, and all or a portion of the pixels or other image elements appearing to be the darker color may be converted so as to appear in the corresponding lighter color. The corresponding colors of the different modes need not be entirely different colors, but could instead be lighter or darker shades, as appropriate, of the same color. Alternatively, a color display in the first mode may be converted to a gray scale display in the second mode, wherein colors in the first mode are converted to corresponding white, black, or shades of gray, wherein, again, such conversions are made by the processor 36 in accordance with a pre-established conversion scheme.

Because there are almost always relatively larger areas of white or other relatively lighter colors or shading in the first mode, there will almost always be relatively larger areas of black or other relatively darker colors or shading in the second mode so that, as a result of the conversion, less light is emitted in the second mode. Furthermore, as desired, when the second mode is selected the processor 36 may be enabled to determine and compare the amount of light that will be emitted in each mode for a given display information, and to convert or not convert based on which mode results in less emitted light.

It should be noted that the term negativizing, as used herein, is meant to encompass more than a mere "inversion" of colors. For example, white need not be converted to its opposite, black, but might instead be converted to a dark gray or, in a color display, to a dark color such as dark blue or green. The conversion scheme is preferably designed to result in maximum viewability of the display information, and may therefore vary depending on such considerations as, for example, the nature or viewing characteristics of the output display 38.

Figure 2:
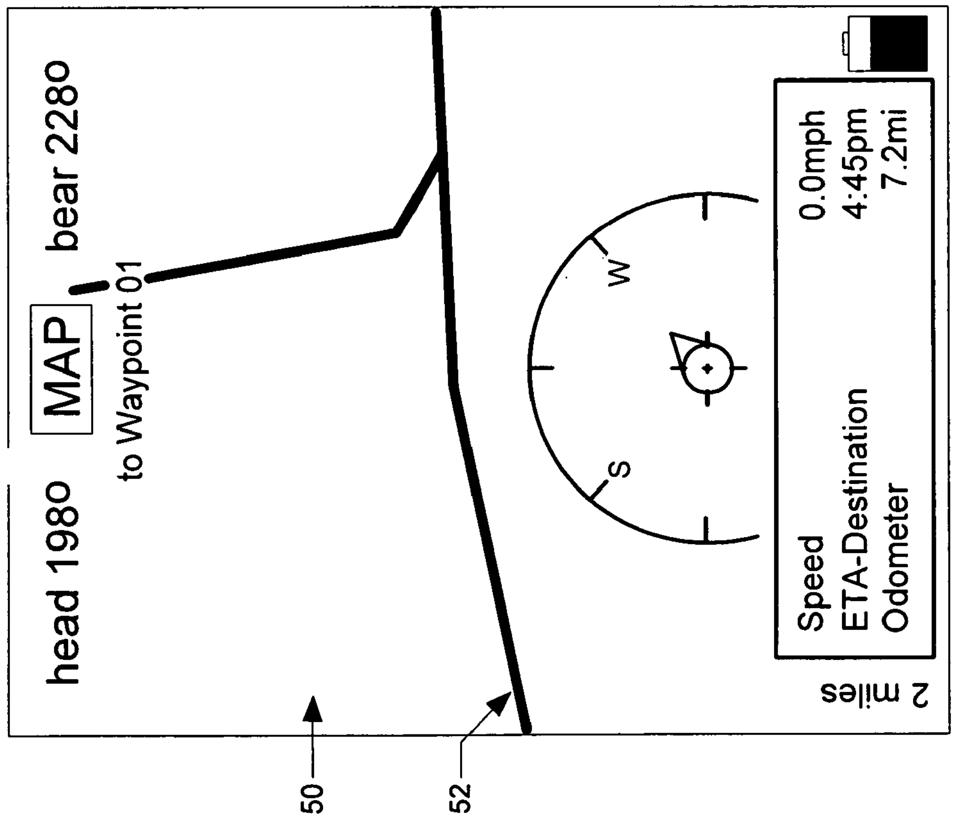
FIG. 2 is a depiction of a virtual compass displayed in a first display mode.
Figure 3:
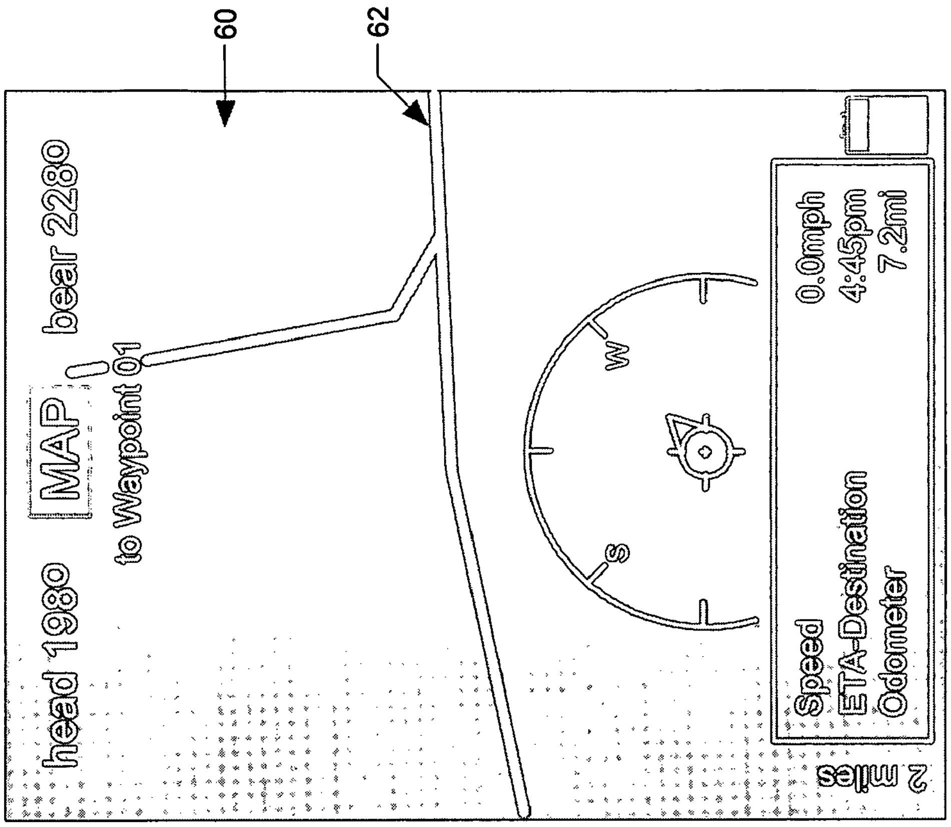
FIG. 3 is a depiction of substantially the same virtual compass displayed in a second display mode which emits less light than the first display mode.

Referring to FIGS. 2 and 3, a virtual compass and other information is shown displayed on the output display 38 in the first display mode (FIG. 2) and, for comparison, in the second display mode (FIG. 3). In the particular conversion scheme shown, white image elements 50 in the first mode are converted to dark gray image elements 60, and black image elements 52 are converted to white image elements 62. The difference in emitted light between the first mode and the second mode can be clearly appreciated. Of course, it should be understood that the conversion scheme reflected in FIGS. 2 and 3 is only one of many possible schemes.

Figure 4:
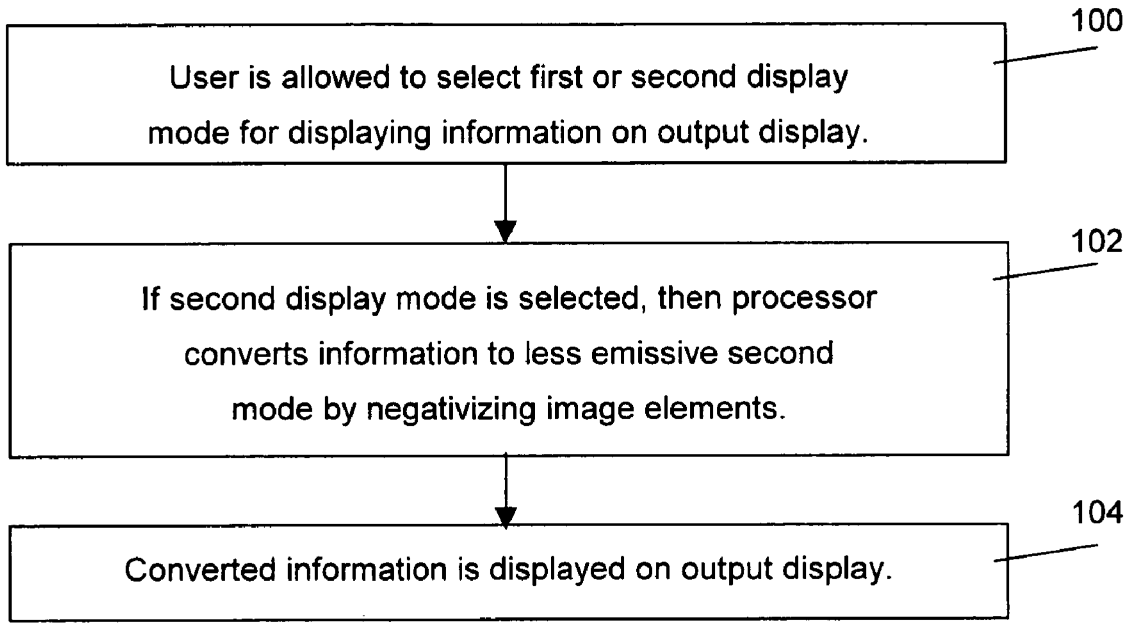
FIG. 4 is a flowchart of steps involved in a preferred embodiment of the method of the present invention as implemented by the GPS device of FIG. 1.

Referring to FIG. 4, in contemplated exemplary but non-limiting use and operation, the present invention may be characterized as functioning in accordance with the following steps. The user is allowed to select either the first mode or the second mode for displaying information on the output display 38, as indicated in box 100. The user's selection is received by the processor 36. The first mode may be a default display mode. If the second mode is selected, then the processor 36 converts the information from the first mode to the less emissive second display mode by negativizing the display information by converting the image elements in accordance with a pre-established conversion scheme, as indicated in box 102. The converted information is then displayed on the output display 38 in the selected display mode, as indicated in box 104.

From the preceding discussion it will be appreciated that the GPS device and method of the present invention provides a number of substantial advantages over the prior art, including, for example, allowing for displaying information in a conventional first display mode, and for displaying substantially the same information in a second display mode which emits less light than the first mode.

Although the invention has been described with reference to the preferred embodiments illustrated in the attached drawings, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A GPS device allowing for reducing emitted light, the GPS device comprising:

(a) a GPS unit including a receiver and an antenna for receiving signals from each of a plurality of sources and, based on the received signals, determining a geographic location of the GPS device;

(b) an input interface for allowing a user to select a second display mode;

(c) a processor for converting display information to the second display mode, wherein the second display mode emits less light than a first display mode; and (d) an output display for displaying the display information.

2. The GPS device as set forth in claim 1, wherein the input interface includes a dedicated selection device, a single actuation of which selects between the first display mode and the second display mode.

3. The GPS device as set forth in claim 1, wherein the processor converts the display information to the second display mode by negativizing a plurality of image elements.

4. The GPS device as set forth in claim 1, wherein the processor converts the display information to the second display mode by converting at least a portion of a plurality of image elements to a darker color.

5. The GPS device as set forth in claim 1, wherein the processor converts the display information to the second display mode by converting at least a portion of a plurality of image elements to a darker shade.

6. The GPS device as set forth in claim 1, wherein the display information is displayed in gray scale and wherein the processor converts the display information to the second display mode by converting any white image elements to black image elements, any black image elements to white image elements, any lighter gray image elements to darker gray image elements, and any darker gray image elements to lighter gray image elements.

7. A GPS device allowing for reducing emitted light associated with displaying information, the GPS device comprising:

(a) a GPS unit including a receiver and an antenna for receiving signals from each of a plurality of sources and, based on the received signals, determining a geographic location of the GPS device;

(b) an input interface for allowing a user to select a second display mode with a single actuation of a dedicated selection device, wherein the second display mode emits less light than a first display mode;

(c) a processor for converting display information to the second display mode by converting at least a portion of any lighter image elements to darker image elements and at least a portion of any darker image elements to lighter image elements; and (d) an output display for displaying the display information in the selected display mode.

8. In a GPS device having a GPS unit including a receiver and an antenna for receiving signals from each of a plurality of sources and, based on the received signals, determining a geographic location of the GPS device; an input interface; a processor; and an output display, the improvement comprising:

the input interface allowing a user to select a first display mode or a second display mode; and the processor converting display information to the second display mode in response to the user's selection of the second display mode, wherein the second display mode emits less light than the first display mode when the display information is displayed on the output display.

* * * * *